United States Patent
Watanabe (10) Patent No.: US 7,136,572 B2
(45) Date of Patent: Nov. 14, 2006

(54) DIGITAL SIGNAL RECORDING APPARATUS

(75) Inventor: Yoshiyuki Watanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1161 days.

(21) Appl. No.: 10/091,460

(22) Filed: Mar. 7, 2002

(65) Prior Publication Data

US 2002/0131769 A1   Sep. 19, 2002

(30) Foreign Application Priority Data

Mar. 12, 2001 (JP) ............................. 2001-068477
Mar. 12, 2001 (JP) ............................. 2001-068478

(51) Int. Cl.
*H04N 5/91* (2006.01)
(52) U.S. Cl. ............................. 386/81; 386/46; 386/68
(58) Field of Classification Search .................. 386/46, 386/67, 68, 95, 96, 109–112, 124, 127
See application file for complete search history.

(56) References Cited

U.S. PATENT DOCUMENTS 5,966,496 A * 10/1999 Takimoto ...................... 386/95
6,026,212 A * 2/2000 Oguro .......................... 386/67
6,788,877 B1 * 9/2004 Hoshi .......................... 386/67
6,963,374 B1 * 11/2005 Nakamura et al. ..... 348/333.11
2001/0043793 A1 * 11/2001 Hori et al. .................... 386/68

FOREIGN PATENT DOCUMENTS

EP        0 957 479       11/1999
JP        11-328639       11/1999

* cited by examiner

*Primary Examiner*—Thai Tran
*Assistant Examiner*—Mishawn Dunn
(74) *Attorney, Agent, or Firm*—Fitzpatrick, Cella, Harper & Scinto (57) ABSTRACT

The present invention proposes a recording apparatus for halfway recording a new image signal obtained by encoding an image signal of an image captured by an image capturing section, to a recording medium on which additional information is recorded in a cyclic manner in units of m tracks (m is an integer of 2 or greater) with an encoded image signal being recorded on n×m/2 tracks per frame, wherein the recording apparatus performs the halfway recording in units of two frames.

16 Claims, 10 Drawing Sheets

DIGITAL SIGNAL RECORDING APPARATUS

BACKGROUND OF THE INVENTION

1. Field of the Invention

The present invention relates to a digital signal recording apparatus, particularly, to processing at the start and the end of recording.

2. Related Background Art

A digital video tape recorder (VTR) for recording an image signal onto a magnetic tape as a digital signal and for reproducing the digital signal therefrom is conventionally known. Recently, a DV format has been proposed by HD Digital VCR Conference as a digital VTR format having the specifications of consumer-use digital VCRs.

According to the DV format, the following two specifications are defined: SD Specifications (hereinafter, referred to as a SD format) for recording an image signal under NTSC standards on 10 tracks per frame; and SD High Compression Specifications (hereinafter, referred to as a SDL format) for recording an image signal on 5 tracks per frame.

In the SD format, besides image signals, various additional information, which is called system data, is recorded.

The system data includes pack information consisting of 5-byte data, ID information contained in an ID portion of each sync block and the like.

The pack information includes: a time-code indicating recording date and time and a frame; a video source and an audio source for accurately reproducing images and sounds, respectively; a video source control indicating the sort of images (a motion image and a static image), and the like.

The ID information includes a track pair number, 1-bit pilot frame information and the like. The track pair number increases from 0 to 4 in a sequential order every three tracks, assigning the track pair number 0 to the head of 10 tracks on which an image signal of one frame is recorded. The 1-bit pilot frame information indicates a frequency (f1 or f2) of a pilot signal recorded on the initial track of 10 tracks on which an image signal of one frame is recorded in the SD format.

The position where the system data to be recorded is also defined in the format. For example, a video source control pack is recorded in a VAUX region on a track. Within each track, the video source control pack is alternately recorded in a sync block numbered 19 and a sync block numbered 156.

The contents of system data recorded in an AAUX region and the VAUX region on an even-numbered track differ from those on an odd-numbered track.

The additional information is also recorded in the SLD format. The contents of the time-code vary every five tracks on which a 1-frame image signal is recorded. As in the SD format, the track pair numbers 0 to 4 recur every 10 tracks, i.e., two frames in the SLD format. For the pilot frame, the numbers 1 and 0 alternately repeat every 10 tracks.

As described above, in the case of recording in the SDL format, if the recording is terminated at the time when data for one frame is recorded, the system data that recurs every two frames in the SDL format is not sometimes completely recorded.

As a result, when the recorded portion is reproduced, the system data that repeats in a cyclic manner every two frames cannot be accurately obtained, which may result in the disturbance of the reproduced images and sounds.

In such a digital VTR, a technique for recording a new image signal so as to be continuous to the-previously recorded scene on a tape on which image signals are already recorded in the SD format, called halfway recording, is known.

In the case where halfway recording is to be performed, with a direction to start the recording in a recording temporary stop state, the feeding of a magnetic tape is first started to reproduce signals. The track at the head of a frame is detected every 10 tracks. The recording is started from the initial track, so that the previously recorded image and a newly recorded image can be continuously reproduced.

As described above, in the case where the halfway recording is started from the initial track of the tracks on which a 1-frame image signal is recorded in the same manner as in the SD format, onto the tape on which image signals are already recorded in the SDL format, there arise the following problems.

As mentioned above, the contents of the system data in the odd-numbered tracks differ from those in the even-numbered tracks. Moreover, since an image of one frame is recorded on five tracks in the SDL format, the track from which the recording is started may be either an odd-numbered track or an even-numbered track.

Therefore, in the case where the halfway recording is performed, it is necessary to detect in advance whether the track from which the recording is to be started is an odd-numbered track or an even-numbered track. Depending on the result of detection, it is required to arrange the system data and modify the recording position.

For the halfway recording, however, whether the track from which the recording is to be started is an odd-numbered track or an even-numbered track can be recognized only immediately before the recording start position. Thus, changing the recording processing for the system data depending on the recording start track will extremely increase the burden on the apparatus.

Likewise, if the halfway recording is started from the track which is not the head track within the 10 tracks on which data for two frames is recorded, among the system data, the contents of data which recurs every two frames in the SDL format are not correspondent to the system data of the portion immediately before the start of halfway recording. As a result, image signals cannot be finely reproduced in the portions before and after the halfway recording.

SUMMARY OF THE INVENTION

An object of the present invention is to solve the above-mentioned problem.

Another object of the present invention is to reproduce a signal in a good condition even when the halfway recording is performed. In pursuing this object, according to an embodiment of the present invention, there is provided a recording apparatus having a first recording mode for recording additional information in a cyclic manner in a unit of m tracks (m is an integer of 2 or greater) and recording an encoded image signal on n×m tracks (n is an integer of 1 or greater) per one frame and a second recording mode for recording the additional information and the encoded image signal on n×m/2 tracks per one frame, the apparatus newly recording an image signal onto a recording medium on which the encoded image signal is recorded in the second recording mode, the apparatus including: encoding means for encoding an input image signal; additional information generation means for generating the additional information; recording means for recording the image signal encoded by the encoding means and the additional information generated by the additional information generation means onto the recording medium; and control means for controlling the recording means to start recording from a track at a head of the n×m tracks on which the image signal for two frames is recorded, in the case where the image signal and the additional information are newly recorded in the second recording means onto the recording medium.

Still another object of the present invention is to reliably record additional information and to reproduce a recorded signal obtained thereby in a good condition. In pursuing this object, according to another embodiment of the present invention, there is provided a recording apparatus, including: signal processing means for cyclically processing an input image signal in a period of n frames (n is an integer of 2 or greater); additional information generation means for generating additional information whose contents cyclically vary in the n-frame period of the image signal; recording means for forming a plurality of tracks on a tape-shaped recording medium by using a rotary head and for recording the image signal output from the signal processing means and the additional information generated by the additional information generation means on m tracks (m is an integer of 1 or greater) out of the tracks for one frame; and control means, in response to a direction to end the recording, for controlling the recording means to terminate the recording at the final track of n×m tracks on which the image signal for n frames is recorded in a cyclic manner.

Other objects and features of the present invention will become further apparent from the detailed description of the aspects of the invention given below in conjunction with the accompanying drawings.

DETAILED DESCRIPTION OF THE PREFERRED EMBODIMENTS

Hereinafter, embodiments of the present invention will be described.

Figure 1:
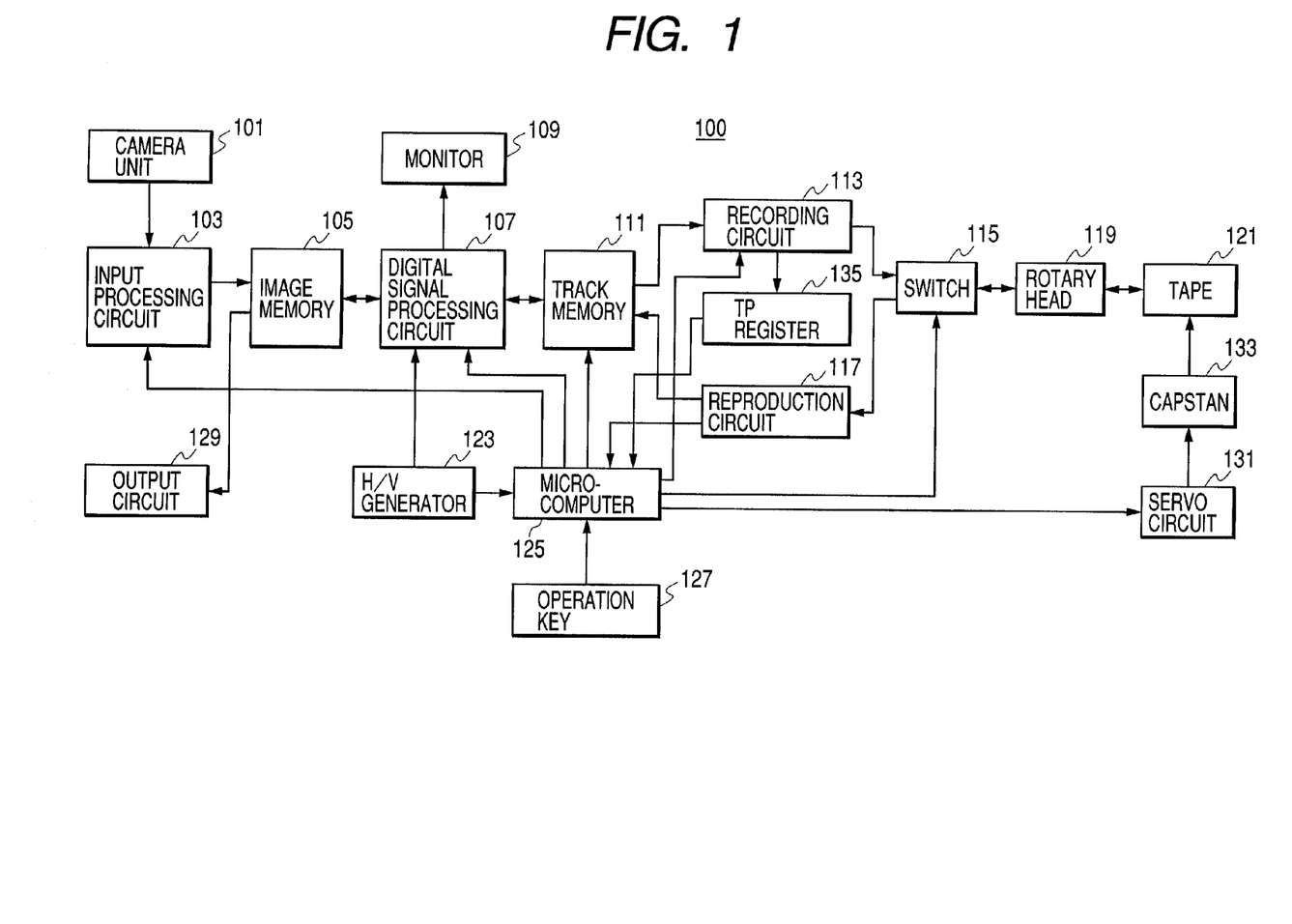
FIG. 1 is a block diagram illustrating a configuration of a digital VTR to which the present invention is applied.

FIG. 1 is a block diagram illustrating a configuration of a camera-incorporated VTR to which the present invention is applied. The VTR shown in FIG. 1 is capable of recording and reproducing an image signal in both the SD format and the SDL format described above.

First, normal recording/reproduction operations will be described.

In the case of recording in the SD format, a recording mode is set to an SD mode with an operation key 127. A direction to start the recording through the operation key 127 starts the recording.

Motion image signals obtained by a camera unit 101 are input to an input processing circuit 103. In the case where the recording mode is set to the SD mode, the input processing circuit 103 samples, among the input motion image signals, a luminance signal at 13.5 MHz and a color-difference signal at 6.75 MHz, and then converts these signals to digital signals so as to obtain an image signal, one frame of which consisting of 720 pixels in the horizontal direction and 480 pixels in the vertical direction. The input processing circuit 103 outputs the obtained image signal to an image memory 105.

The image memory 105 is capable of recording an image signal for a plurality of frames, in this embodiment, an image signal for two frames, which is not subjected to compression coding. The image signal is read out in unit of a block (DCT block), each block consisting of 8 pixels in the horizontal direction and 8 pixels in the vertical direction, in the order suitable for the processing of a digital signal processing circuit 107. After performing DCT, quantization, and variable-length coding processing on the image signal read out from the image memory 105, the digital signal processing circuit 107 writes the image signal in a track memory 111.

The track memory 111 is capable of recording the image signal for a plurality of frames, for three frames in this embodiment, encoded in accordance with the SD format. In the track memory 111, encoded data of each DCT block is written. A recording circuit 113 reads out the image data recorded in the track memory 111 at the timing designated by a microcomputer 125. The recording circuit 113 reads out the image data in unit of a macro block in the order of scanning for the screen, each macro block consisting of a predetermined number of DCT blocks. Following the direction of the microcomputer 125, the recording circuit 113 generates the above-mentioned system data. Then, synchronous data and ID data are added to these image data and system data to form a sync block. The recording circuit 113 performs error correction encoding processing of recording data on a recording data basis of one track. Further, after digital modulation processing, a pilot signal is multiplexed onto the data, which is in turn output to a rotary head 119 through a switch 115.

The switch 115 selects the data output from the recording circuit 113 during recording and outputs the selected data to the rotary head 119.

On the other hand, in response to the direction to start the recording, the microcomputer 125 outputs a control signal to a servo circuit 131 to control a capstan 133 such that a tape 121 stably runs at a predetermined velocity V corresponding to the SD format.

The rotary head 119 forms a number of helical tracks on the tape 121 whose running is controlled in the above-described manner. Image data of one frame is recorded on 10 tracks. In this embodiment, FIG. 2 shows the state of recording tracks formed on the tape 121 in accordance with the SD format.

Figure 2:
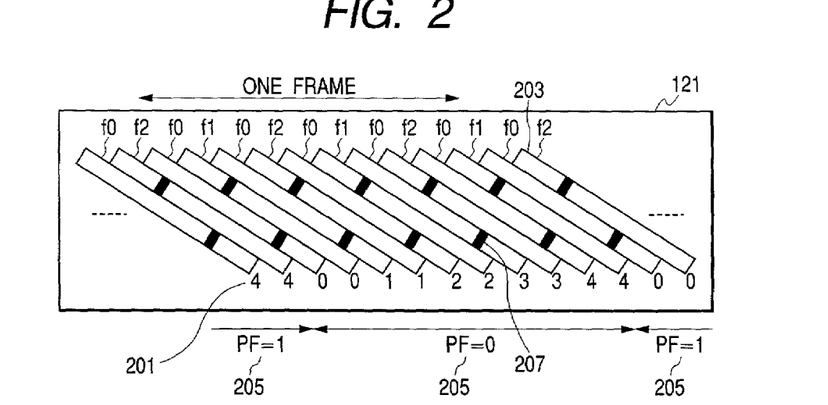
FIG. 2 is a diagram illustrating a recording format on a tape in accordance with the SD format.

As shown in FIG. 2, image data of one frame is recorded on 10 tracks in the SD mode. The reference numeral 201 indicates a value of a track pair number recorded on each track, and the reference numeral 203 indicates a frequency of a pilot signal recorded on each track. The reference numeral 205 denotes pilot frame information recorded on each track; in the SD mode, pilot frame information is recorded in a cycle of two frames, i.e., 20 tracks. The reference numeral 207 denotes a video source control pack recorded on each track. As described above, the recorded position of the video source control pack differs in each track.

In FIG. 1, the reference numeral 135 denotes a track pair register (TP register) for recording information of the track pair numbers recorded by the recording circuit 113. By confirming the contents of the TP register 135, the microcomputer 125 can detect a phase of the track on which recording is currently performed.

A H/V generator 123 is for generating internal synchronizing signals that are necessary for the processing of the digital signal processing circuit 107, that is, a horizontal synchronizing signal H and a vertical synchronizing signal V.

Next, an operation during reproduction of data in the SD format will be described.

Upon a direction of reproduction through the operation key 127, the microcomputer 125 outputs a control signal to the servo circuit 131 to control the rotational operation of the capstan 133 so as to feed the tape 121 at the velocity V corresponding to the SD format.

Then, data is reproduced from the tape 121 by the rotary head 119, and then is output to the reproduction circuit 117 through the switch 115. The switch 115 is controlled by the microcomputer 125, and during reproduction, outputs a reproduction signal from the rotary head 119 to the reproduction circuit 117.

The reproduction circuit 117 demodulates the reproduced data and corrects an error in the reproduced data. Furthermore, the reproduction circuit 117 detects synchronous and ID data in the reproduced data and writes the image data to the track memory 111 while outputting system data and other data to the microcomputer 125. Information indicating a recording format is contained in the data output to the microcomputer 125. Based on this information, the microcomputer 125 can detect which is the recording format of the image data, the SD format or the SDL format.

The reproduced image data stored in the track memory 111 is read out to the digital signal processing circuit 107 at predetermined timing. The digital signal processing circuit 107 performs decoding processing, which is reverse to the processing for recording, on the image data read out from the track memory 111, and then outputs the decoded image data to the image memory 103. The image signal stored in the image memory 103 is read out by an output circuit 129 to be output to an external monitor and the like.

Next, recording/reproducing operations in the SDL format will be described.

The recording mode is set to an SDL mode with the operation key 127. The direction to start the recording through the operation key 127 starts the recording in the SDL format.

Image signals output from the camera unit 101 are processed by the input processing circuit 103 in accordance with the SDL format. Specifically, the input processing circuit 103 samples a luminance signal of input image signal at 13.5 MHz and a color-difference signal of input image signal at 6.75 MHz, and then converts these signals to digital signals of 10.125 MHz and 3.375, respectively, after filter processing, so as to obtain an image signal, one frame of which consisting of 540 pixels in the horizontal direction and 480 pixels in the vertical direction. This amount of information corresponds to two-thirds of that in the SD format.

The image signal output from the input processing circuit 103 is stored in the image memory 105, and is read out in units of DCT block in the order suitable for processing by the digital signal processing circuit 107.

As in the SD format, the digital signal processing circuit 107 performs DCT, quantization, and variable-length coding processing on each DCT block. This coding processing is performed so that the amount of code per frame is third-fourths of that in the SDL format.

As described above, the amount of information in the SDL format is reduced by the input processing circuit 103 to two-thirds of that in the SD format, which is then further reduced to third-fourths through the encoding processing by the digital signal processing circuit 107. As a result, the amount of information is, in total, $(2/3 \times 3/4)=1/2$ of that in the SD format.

The digital signal processing circuit 107 encodes the image signal in this manner and write it to the track memory 111. The recording circuit 113 reads out the image data recorded in the track memory 111 at the timing based on a control signal from the microcomputer 125. The recording circuit 113 adds synchronous and ID data to the image data, and performs error correction encoding processing on the image data in units of image data to be recorded for one track. Moreover, as in the SD mode, the recording circuit 113 generates additional data such as system data, and performs digital modulation processing on the image data so as to multiplex a pilot signal thereon. The image data after these processing is then output to the rotary head 119 via the switch 115.

The microcomputer 125 outputs a control signal to the servo circuit 131 to control the rotation speed of the capstan 133 so that the tape 121 is stably fed at one-half of the velocity in the SD mode, that is, at a velocity of V/2 which is a feeding speed corresponding to the SDL format.

The rotary head 119 forms a number of helical tracks on the tape 121 by using a head element having an arrangement different from that in the SD mode. The image data for one frame is recorded on five tracks. As a head element used in the SDL format, an element disclosed in Japanese Laid-open Patent Application No. 11-328639 can be used. In this embodiment, FIG. 3 shows the state of the tracks formed on the tape 121 in accordance with the SDL format.

Figure 3:
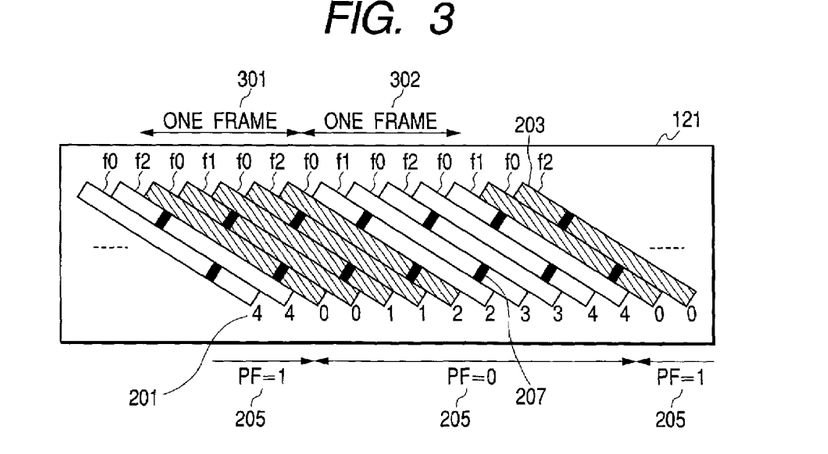
FIG. 3 is a diagram illustrating a recording format on a tape in accordance with the SDL format.

In FIG. 3, the same elements as those in FIG. 2 are denoted by the same reference numerals. In the SDL format, data 301 for one frame and data 302 for another frame are respectively recorded on five tracks as shown in FIG. 3.

Next, during the reproduction, upon reception of the direction of reproduction through the operation key 127, the microcomputer 125 outputs a control signal to the servo circuit 131 to control the capstan 133 so that the tape 121 is fed at a feeding velocity of V/2 corresponding to the SDL format.

The rotary head 119 reproduces the data from the tape 121, and output it to the reproduction circuit 117 via the switch 115. As in the SD mode, the reproduction circuit 117 detects synchronous and ID data from the reproduced data, and writes the reproduced image data to the track memory 111 in accordance with the ID data. Moreover, the reproduction circuit 117 detects system data from the reproduced data, and outputs it to the microcomputer 125.

The digital signal processing circuit 107 reads out the reproduced data stored in the track memory 111, performs decoding processing in accordance with the SDL format, and then outputs the decoded data to the image memory 103. The image signal stored in the image memory 103 is read out by the output circuit 129 to be output to equipment such as an external monitor.

The monitor 109 displays an image in accordance with the image signal output from the camera unit 101 in the recording mode while displaying an image in accordance with the image signal read out from the image memory 103 in the reproduction mode.

Next, an operation at the end of recording in the SDL format will be described.

FIGS. 4A to 4F are timing charts for illustrating the operation of the VTR 100 at the end of recording.

Figures 4A, 4B:
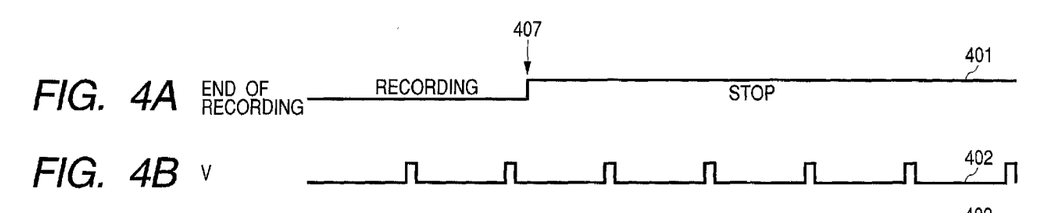
FIGS. 4A, 4B, 4C, 4D, 4E and 4F are timing charts, showing an operation at the end of recording in one embodiment of the present invention.

The reference numeral 401 in FIG. 4A denotes a recording end signal generated within the microcomputer 125 when the stop of recording is directed through the operation key 127 during the recording in the SDL format. After the recording end signal becomes an H level indicating the end of recording, the recording end operation will be started.

Figures 4C, 4D:
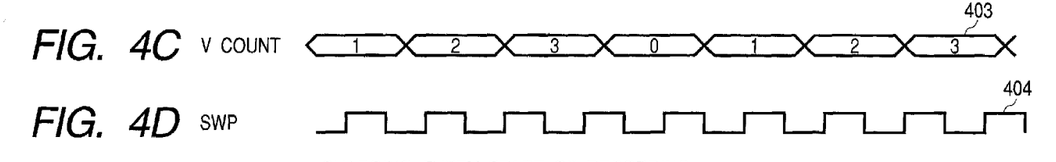

The reference numeral 402 in FIG. 4B denotes a V signal generated by the H/V generator 123, and the reference numeral 403 in FIG. 4C denotes a count value of an internal counter in the microcomputer 125, which value recurs from 0 to 3 by counting the V signal. Based on this count value 403, a processing phase of the digital signal processing circuit 107 is determined, and system data that recurs in a cycle of 2 frames such as a track pair is generated.

Figures 4E, 4F:
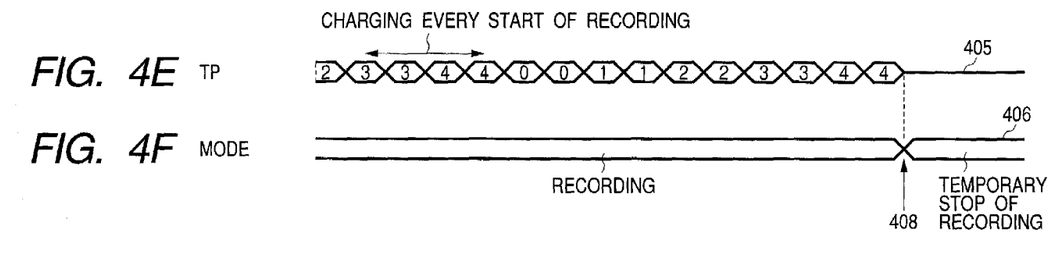

The reference numeral 404 in FIG. 4D denotes a switching pulse (SWP) for selecting a plurality of magnetic head elements, and the reference numeral 405 in FIG. 4E denotes a value of a track pair number stored in the TP register during the recording. Although the track pair number is synchronous with the V signal 402, the amount of delay of the track pair number is determined at the start of recording and varies at each starting point of recording. The reference numeral 406 in FIG. 4F denotes a transition point between the recording mode and the temporary stop mode of recording of the VTR.

At the end of recording, the microcomputer 125 checks a value of the TP register 135 after the recording end signal 401 becomes a high level at timing 407. Then, at timing 408 of a track following two contiguous tracks in which a value of the TP register is successively 4, the microcomputer 125 outputs a control signal to the digital signal processing circuit 107, the track memory 111, the recording circuit 113, and the switch 115 so as to stop the recording. Then, the microcomputer 125 outputs a control signal to the servo circuit 131 so as to stop the feeding of the tape 121 by the capstan 133.

As described above, according to this embodiment, since the recording is stopped at the timing just after the recorded track pair number shows successively 4 in two contiguous frames, the recording never fails to stop at the end of a unit of two frames at the end of recording in the SDL format.

Moreover, at the end of recording in the SD format, the recording is controlled to be stopped at the end of data of one frame, that is, at the end of a unit of 10 tracks. As a result, the same control operation by means of the microcomputer 125 can be effective for both the end of recording in the SD format and the end of recording in the SDL format.

Next, a second embodiment of the present invention will be described.

The timing of the end of a unit of two frames is detected based on a value of the TP register in the first embodiment. In the second embodiment, the timing of the end of a unit of two frames is detected based on a read-out address of the track memory 111.

Figure 5:
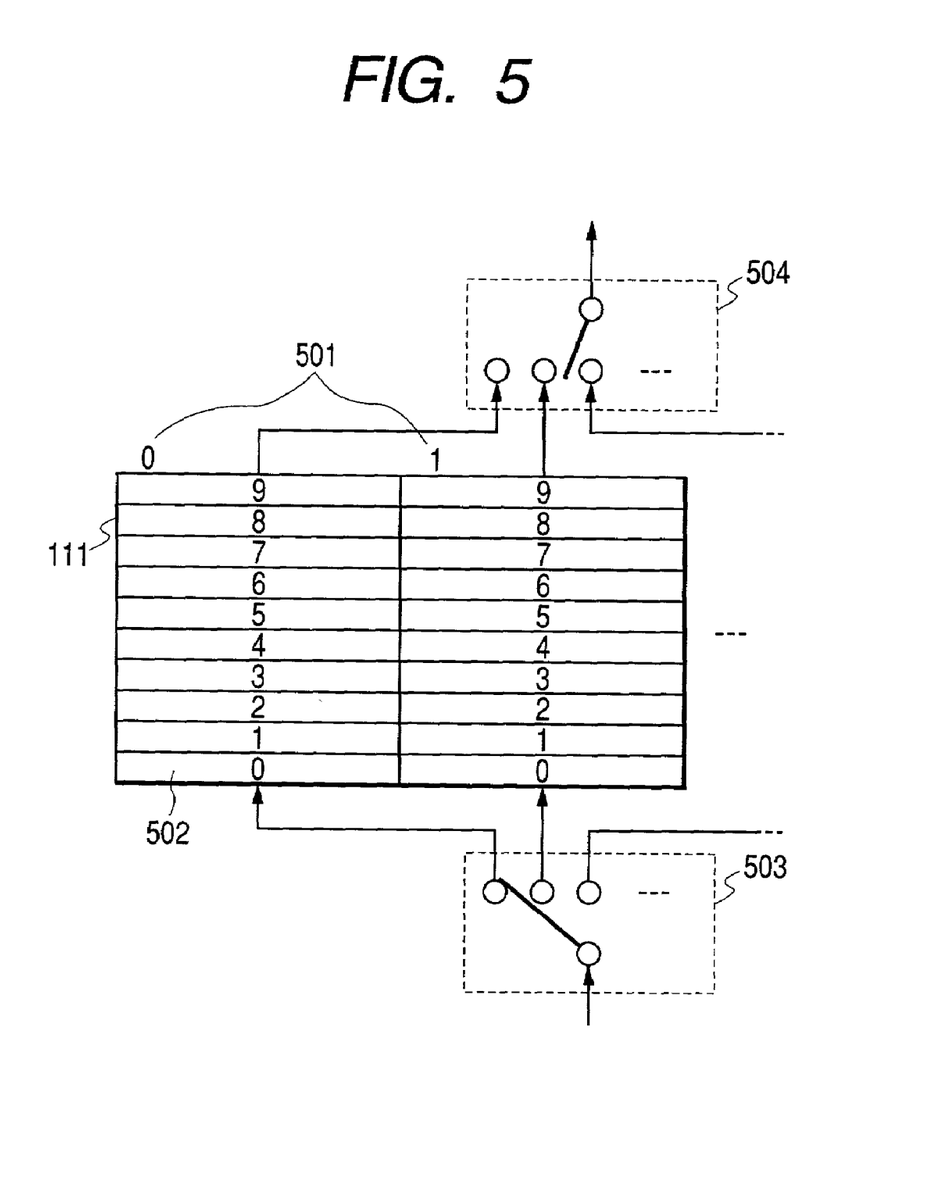
FIG. 5 is a diagram illustrating a configuration of a track memory.

FIG. 5 is a diagram schematically showing a configuration of the track memory 111. As described above, the track memory 111 is capable of recording data for three frames that is encoded in accordance with the SD format. FIG. 5 shows the state of only two frames among three frames.

In FIG. 5, the reference numeral 501 denotes the number of a memory bank of the track memory 111. Each bank is capable of recording data of one frame, encoded in the SD format. In this embodiment, a writing state and a reading-out state can be switched over for each bank.

The reference numeral 502 denotes an address corresponding to a track. For example, the data recorded at an address 0 is recorded in the head track of 10 tracks on which data of one frame is recorded in the SD format. Thus, during recording in the SDL format, data for two frames is recorded in each bank.

The reference numeral 503 denotes a switch for a bank written to the track memory 111. Data output from the digital signal processing circuit 107 is supplied to the switch 503 during recording, while data output from the reproduction circuit 117 is supplied during reproduction. The reference numeral 504 denotes a switch for a bank read out from the track memory 111. The switch 504 outputs data to the recording circuit 113 during recording while outputting data to the digital signal processing circuit 107 during reproduction. The switching of these switches 503 and 504 is controlled by the microcomputer 125.

For example, during recording, the address 502 is increased at every SWP so as to read out data recorded at a specified address and to output the read-out data to the recording circuit 113. In this second embodiment, a read-out address during this operation is monitored by the microcomputer 125 so as to detect in which track within the frame the data is currently recorded.

Figure 6:
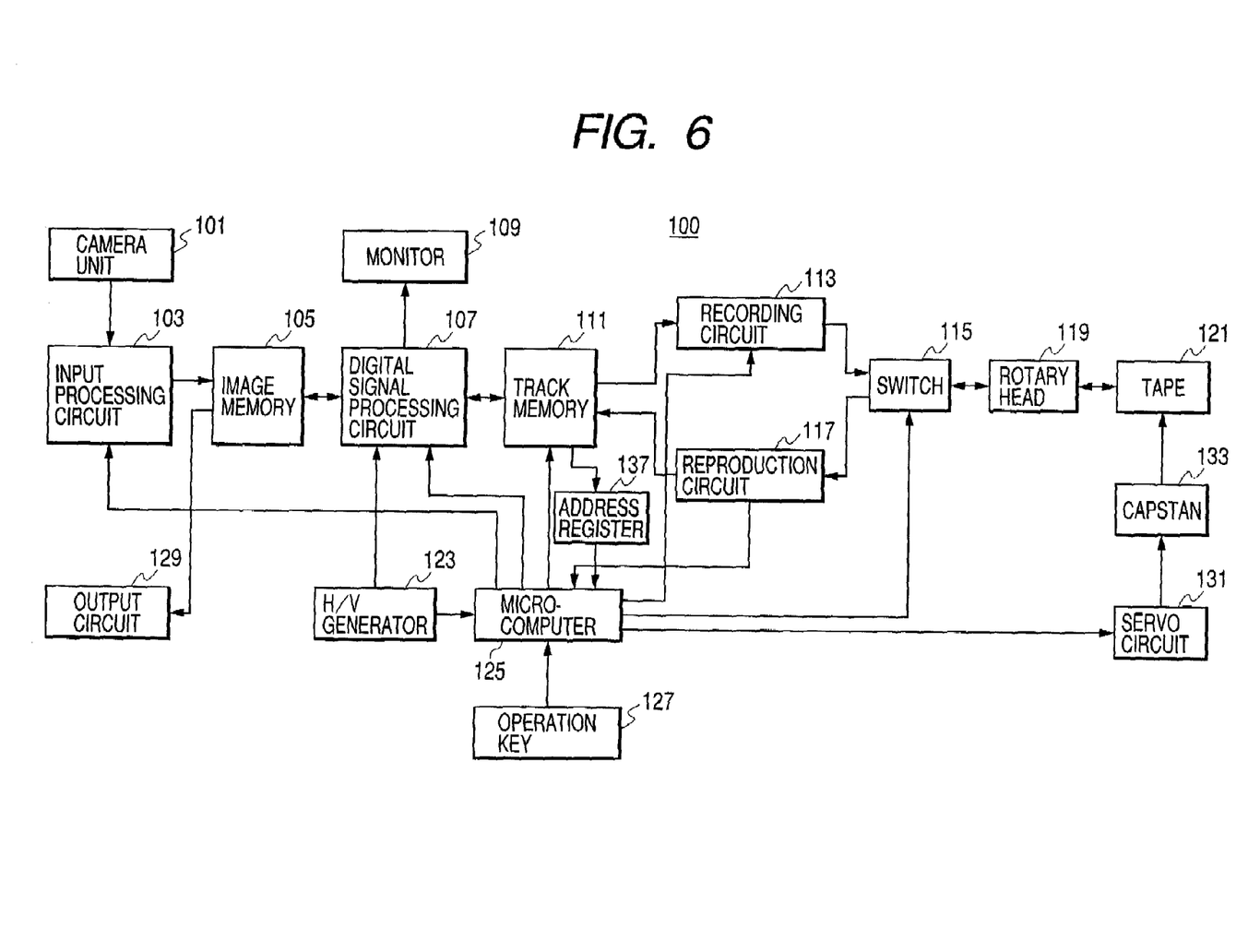
FIG. 6 is a block diagram showing another configuration of a digital VTR to which the present invention is applied.

FIG. 6 is a block diagram showing a configuration of a digital VTR according to this second embodiment. The components of the digital VTR shown in FIG. 6 are the same as those of the VTR 100 shown in FIG. 1 except that the TP register 135 is replaced by an address register 137. Furthermore, since the processing of the VTR shown in FIG. 6 is the same as that of the VTR shown in FIG. 1 except the processing at the end of recording, the description for basic operations during recording/reproduction will be herein omitted. Hereinafter, processing at the end of recording in the SDL format will be described.

FIGS. 7A to 7F are timing charts showing an operation at the end of recording in the SDL format according to this embodiment. Signals 701 to 704 and 706 shown in FIGS. 7A to 7D and 7F are the same as the signals 401 to 404 and 406 shown in FIGS. 4A to 4D and 4F.

Figure 7A:
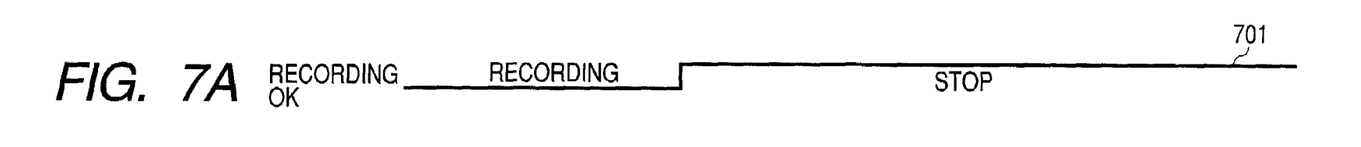
FIGS. 7A, 7B, 7C, 7D, 7E and 7F are timing charts, showing an operation at the end of recording in one embodiment of the present invention.
Figure 7B:
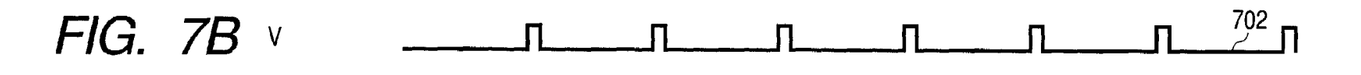
Figure 7C:
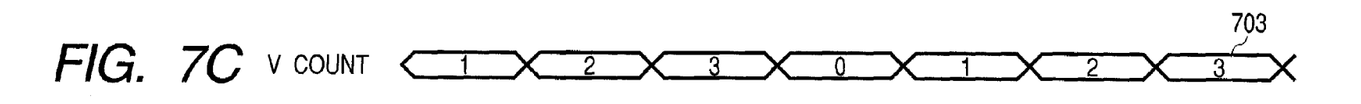
Figure 7D:
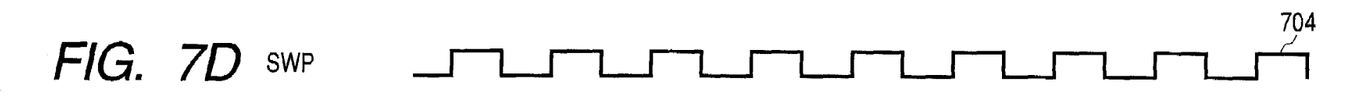
Figure 7E:
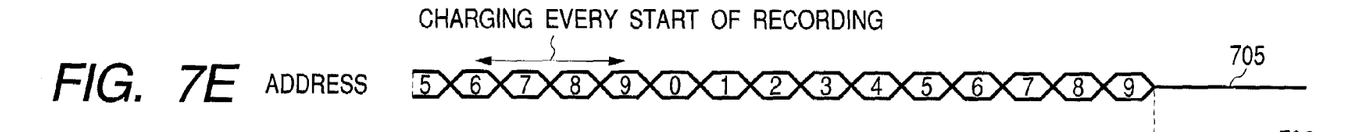
Figure 7F:
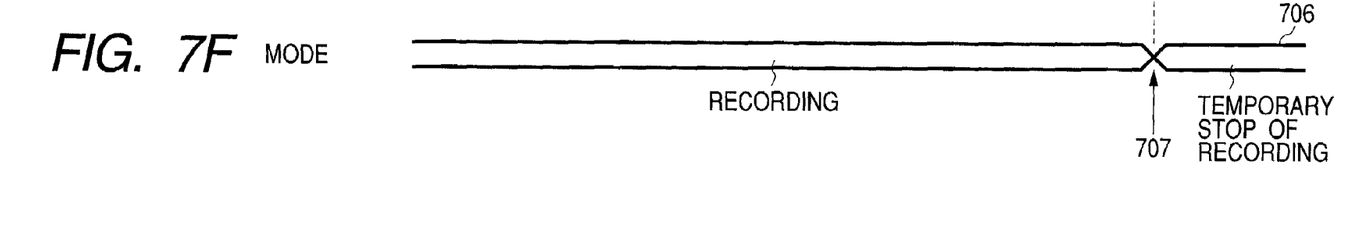

The reference numeral 705 in FIG. 7E denotes a read-out address of the track memory 111, which is stored in the address register 137 during recording. Although the read-out address 705 is synchronous with the V signal 702, its amount of delay is determined at the start of recording, and varies at every start of recording.

At the end of recording, the microcomputer 125 checks a value of the address register 137 after the recording end signal 701 becomes a high level. Then, at timing 707 of the track following the track in which a value of the address register is '9', the microcomputer 125 outputs a control signal to the digital signal processing circuit 107, the track memory 111, the recording circuit 113, and the switch 115 so as to stop the recording. Then, the microcomputer 125 outputs a control signal to the servo circuit 131 so as to stop the feeding of the tape 121 by the capstan 133.

As described above, according to this embodiment, the recording is controlled to be stopped at timing of the track following the track in which the address register has a value of 9, that is, the last track of 10 tracks on which data of two frames is recorded. As a result, at the end of recording in the SDL format, the recording can be stopped at the end of a unit of two frames without fail.

In the above-described embodiments, the case where the present invention is applied to a digital VTR conforming to the DV format has been described. However, the present invention is also applicable to the case where image data is recorded on m tracks (m is an integer of 1 or greater) per frame, with additional information such as system data which varies in a cyclic manner in a period of n frames (n is an integer of 2 or greater).

In the above-described second embodiment, the address of the track memory is used to detect a processing phase of the image signal within a period of two frames. However, a write address of the digital signal processing circuit 107 or the like can also be used for detection.

Next, a third embodiment of the present invention will be described.

Figure 8:
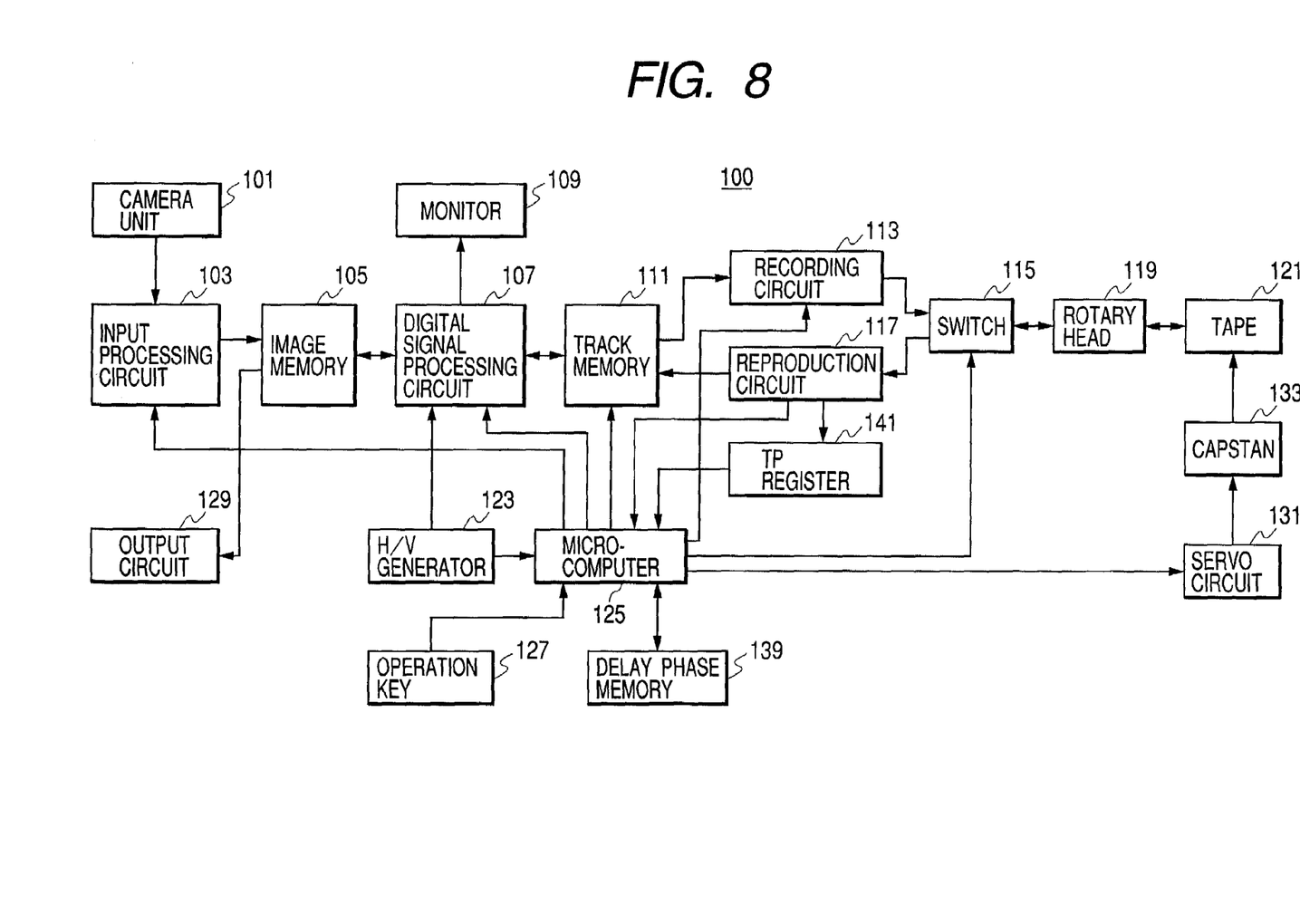
FIG. 8 is a block diagram illustrating another configuration of a digital VTR to which the present invention is applied.

FIG. 8 is a block diagram showing a configuration of a camera-incorporated VTR in this embodiment. The same components as those in FIGS. 1 and 6 are denoted by the same reference numerals in FIG. 8. The VTR shown in FIG. 8 differs from that shown in FIG. 1 in that the TP register 135 is eliminated and that a delay phase memory 139 and a TP register 141 are added.

Also in the apparatus shown in FIG. 8, an image signal can be recorded/reproduced in both the SD format and the SDL format described above. Since the basic recording/reproduction operations in the SD mode and the SDL mode are the same as those described in the above embodiments, the detailed description thereof is herein omitted.

Next, an operation for performing halfway recording in the SDL format onto a tape on which image data has been already recorded in the SDL format, which is a characteristic structure of this embodiment, will be described.

Figure 9:
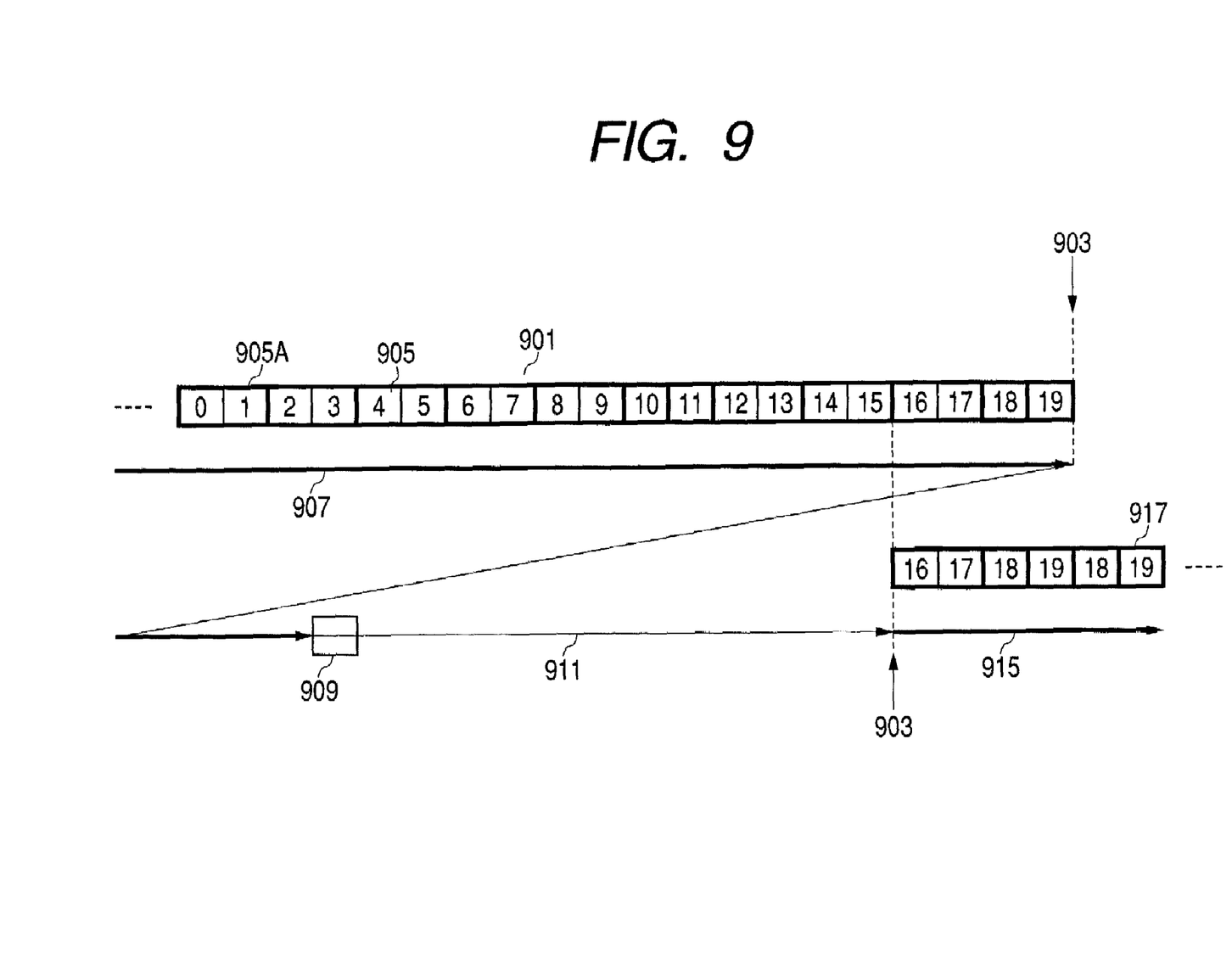
FIG. 9 is a diagram illustrating an operation during halfway recording according to one embodiment of the present invention.

FIG. 9 is a diagram showing the state of halfway recording. The reference numeral 901 denotes a state of data previously recorded on the tape 121. The end of recording of this data is designated by the reference numeral 903. A block denoted by 905 indicates a recording area of one frame on the tape 121, that is, five tracks in the SDL format. A numeral in each block indicates a number of a frame.

As described above, system data such as a track pair number is recorded in a recurring manner in a cycle of two frames, that is, ten tracks in the SDL format. The head track of the frame becomes an even-numbered track in every two frames. In FIG. 9, a block for two frames is denoted by 905A, surrounded by a bold line. The reference numeral 907 denotes the movement of the tape at the previous recording.

More specifically, during the previous recording, the tape 121 is fed by the microcomputer 125 as is indicated by 907 so as to record the previous image data 901 thereon. The tape 121 is fed to the recording end position 903 to terminate the recording. Then, the tape 121 is fed in a reverse direction for a predetermined period of time, then is again fed in a forward direction for a predetermined time. Thereafter, the feeding of the tape 121 is stopped at a stop position 909 so that the tape 121 is in a temporary stop state of recording.

Upon reception of the direction to start the recording through the operation key 129 in this state, the microcomputer 125 feeds the tape 121 in a forward direction 911 again so that the tape 121 is brought to be in a recording run-up state. In this recording run-up state 911, the rotary head 119 reproduces the data recorded on the tape 121 and outputs the reproduced data to the reproduction circuit 117 via the switch 115. The microcomputer 125 controls the switch 115 so as to supply a reproduced signal from the rotary head 119 to the reproduction circuit 117.

In this recording run-up state, the reproduction circuit 117 detects information of a track pair number from the reproduced data and supplies the detected information to the track pair register (TP register) 141. Therefore, information of the track pair number detected by the reproduction circuit 117 is recorded into the TP register 141 for each track. The microcomputer 125 reads the track pair number recorded in the TP register 141 for each track to detect a phase of the track on the tape, which is currently reproduced.

This recording run-up operation is required to stabilize the running of the tape 121 as well as to newly generate information necessary to continuously reproduce new image data 917 that is recorded to overlap the previously recorded part 901 (for example, a time-code and the like) and to stably reproduce these information recorded in the part just before the start of recording. It should be noted that the image data reproduced during the recording run-up period does not undergo decoding processing by the digital signal processing circuit 107.

After confirming the stable feeding of the tape 121 and the stable reproduction of a time-code and other information, and information of a track pair number as described above, the microcomputer 125 controls the digital signal processing circuit 107 to start encoding processing for the image data. Furthermore, the microcomputer 125 starts to read out the image data from the track memory 111, thereby starting the recording. In FIG. 9, the recording is started at timing 913.

The microcomputer 125 generates a new time-code based on the time-code reproduced during the recording run-up period so that the new time-code is consecutive to the reproduced time-code at the halfway recording start point 913, and then outputs the new time-code to the recording circuit 113. The microcomputer 125 also determines a frequency of a pilot signal to be multiplexed, based on the information of a pilot frame reproduced during the recording run-up period.

In this embodiment, in the previously recorded data 901, the recording start timing 913 is determined so that the recording is started at the end of a unit of the two frames 905A as described above.

Next, a method of determining the recording start timing by the microcomputer 125 will be described with reference to FIGS. 10A to 10F. FIGS. 10A to 10F are timing charts for illustrating an operation of the microcomputer 125 at the start of halfway recording.

Figure 10A:
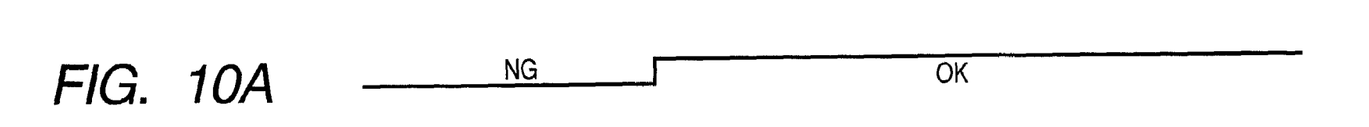
FIGS. 10A, 10B, 10C, 10D, 10E and 10F are timing charts, showing an operation during halfway recording according to one embodiment of the present invention.
Figure 10B:
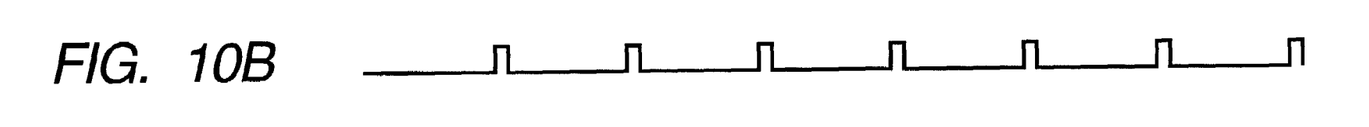
Figure 10C:
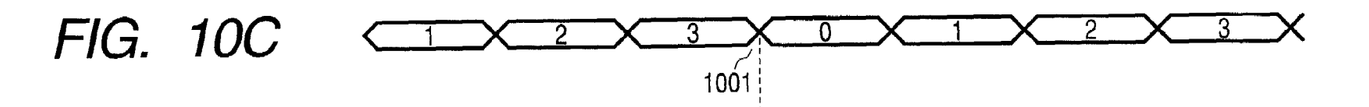

FIG. 10A shows a 1-bit recording enable signal generated in the microcomputer 125 in the case where a running state of the tape 121 and a reproduction state of data are stabilized. The recording is allowed with the 1-bit recording enable signal being at a logic H. FIG. 10B shows a vertical synchronizing signal generated by the H/V generator 123, and FIG. 10C shows a count value obtained by counting the vertical synchronizing signal with an internal counter of the microcomputer 125. The internal counter counts the vertical synchronizing signal in a cyclic manner with a count value of 0 to 3. Based on the count value, a processing phase by the digital signal processing circuit 107 is determined and system data is generated.

Figure 10D:
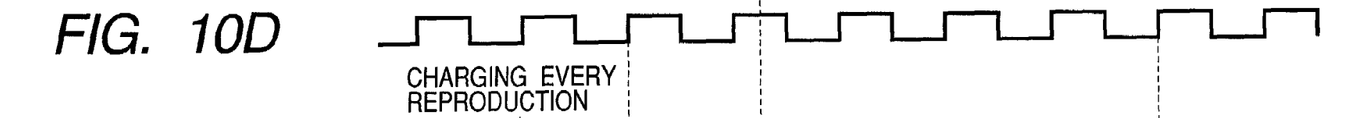
Figure 10E:
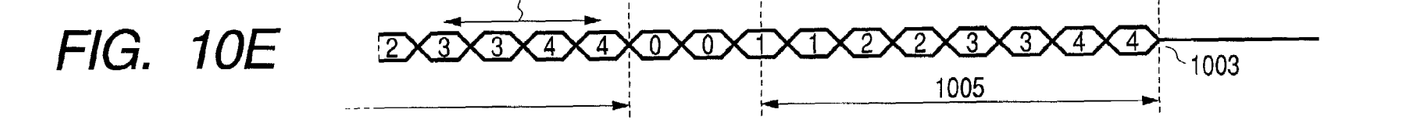

FIG. 10D shows a switch pulse (SWP) for selecting a plurality of head elements, and FIG. 10E shows a track pair number reproduced from the tape 121 and recorded in the TP register 141 during the recording run-up period. Although the track pair number is synchronous with the vertical synchronizing signal, its amount of delay with respect to the vertical synchronizing signal varies at every start of halfway recording.

The amount of delay of the track pair number with respect to the vertical synchronizing signal is denoted by the reference numeral 1005. The amount of delay 1005 can be obtained by measuring a time period from a point 1001 at which a count value of the vertical synchronizing signal becomes 0 to a point 1003 at which the track pair number becomes 0, by means of the microcomputer 125 during the recording run-up period. In this embodiment, the amount of delay is detected by counting a SWP. The detected count value is recorded in the delay phase memory 139 as delay phase information.

Figure 10F:
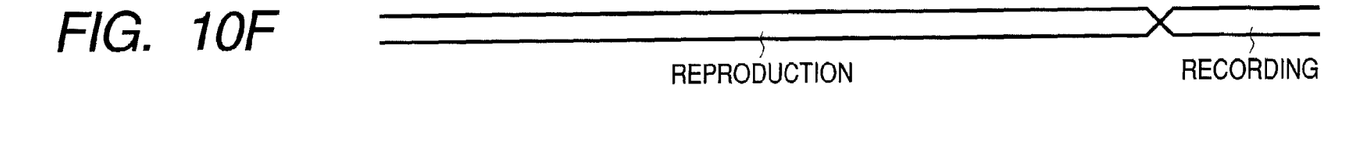

FIG. 10F shows a transition between a recording mode and a reproduction mode at the start of halfway recording. As described above, at the start of halfway recording, the reproduction mode is set. Then, after the recording enable signal shown in FIG. 10A indicates the recording OK, the microcomputer 125 controls the operation of the digital signal processing circuit 107, the read-out timing of the image data from the track memory 111, the switch 115 and the like so that the recording is started at timing 1003, which is delayed by the amount of delay 1005 from the point at which a count value of the vertical synchronizing signal becomes 0, based on the delay phase information recorded in the delay phase memory. As a result, the recording is started at the end of a unit of two frames without fail.

As described above, according to this embodiment, when new image data is halfway recorded in the SDL format on the tape on which the image data is already recorded in the SDL format, a phase of the track which is currently reproduced is detected by using information of a track pair number in the reproduced data. Based on the result of detection, timing for starting the recording is determined so as to start the recording from the track just after the end of a unit of two frames. Therefore, the recording is always started with an even-numbered track in the halfway recording in the SDL format. Accordingly, it is not necessary to discriminate whether a recording start track is an even-numbered track or an odd-numbered track. In addition, it is not necessary to modify the system data to be recorded in accordance with the result of discrimination.

Thus, the burden on the system can be extremely reduced even in the case where a circuit serves for both the SD format and for the SDL format.

In this embodiment, information of the track pair number is used to detect a phase difference between the vertical synchronizing signal and the reproduced data. Besides, information of a pilot frame can also be used for detection, for example.

FIGS. 11A to 11F are timing charts for showing an operation of the microcomputer 125 during halfway recording in such a case.

Figure 11A:
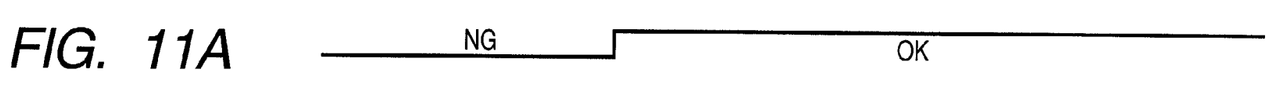
FIGS. 11A, 11B, 11C, 11D, 11E and 11F are timing charts, showing another operation during halfway recording according to one embodiment of the present invention.
Figure 11B:
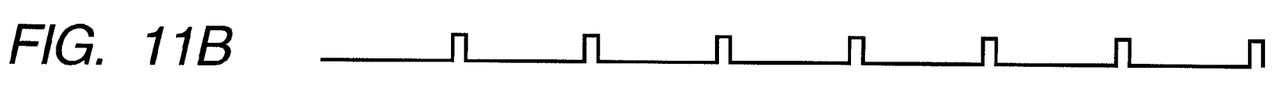
Figure 11C:
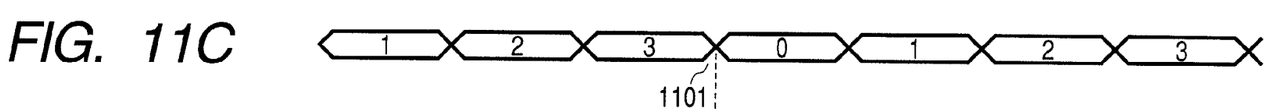
Figure 11D:
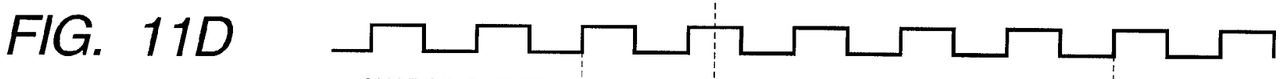
Figure 11E:
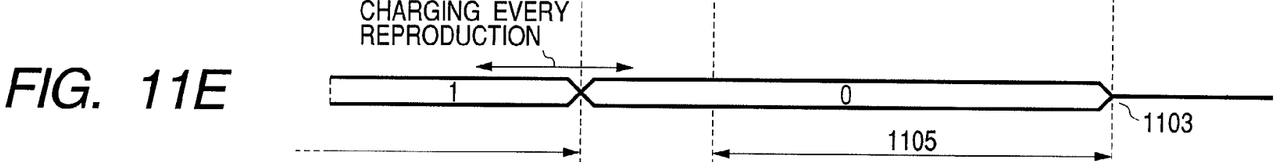
Figure 11F:
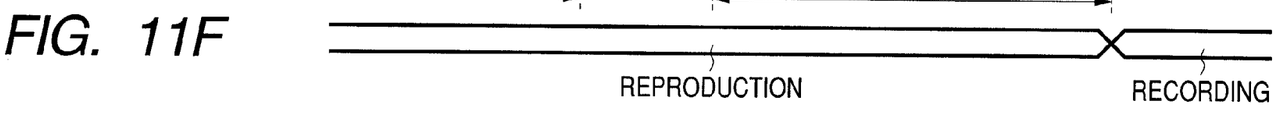

Among FIGS. 11A to 11F, FIGS. 11A to 11D and 11F are the same as FIGS. 10A to 10D and 10F, respectively. FIG. 11E shows information of a pilot frame detected from data reproduced from the tape 121. As shown in FIGS. 11A to 11F, during the recording run-up period, the amount of delay 1105 is detected based on a difference between timing 1101 at which a count value of the vertical synchronizing signal becomes 0 and timing 1103 at which a pilot frame changes to be 0 or 1. After the recording is enabled, the recording is started at timing 1103, which is delayed by the amount of delay 1105 from the point at which a count value of the vertical synchronizing signal becomes 0.

As a result, the recording can be started at the end of a unit of two frames without fail.

Although the case where the present invention is applied to a digital VTR conforming to the DV format has been described in the above embodiments, the present invention is also applicable to, for example, the following case: new image data and additional information are recorded to a recording medium, on which additional information such as system data is already recorded in a cyclic manner in units of m tracks (m is an integer of 2 or greater) and image data is already recorded in n×m tracks (n is an integer of 1 or greater) per frame.

By adding the TP register 135 shown in FIG. 1 to the VTR shown in FIG. 8 so as to control the recording stop processing in the SDL mode as described in the above first embodiment, it is possible for the stop of the recording in the SDL format to stop the recording at the end of data 905A of two frames as shown in FIG. 9.

Many widely different embodiments of the present invention may be constructed without departing from the spirit and scope of the present invention. It should be understood that the present invention is not limited to the specific embodiments described in the specification, except as defined in the appended claims.

What is claimed is:

1. A recording apparatus having a first recording mode for recording additional information in a cyclic manner in a unit of m tracks, m being an integer of 2 or greater, and recording an encoded image signal on n×m tracks per one frame, n being an integer of 1 or greater, and a second recording mode for recording the additional information and the encoded image signal on n×m/2 tracks per one frame, said apparatus newly recording an image signal onto a recording medium on which the encoded image signal is recorded in the second recording mode, said apparatus comprising:
   encoding means for encoding an input image signal;
   additional information generation means for generating the additional information;
   recording means for recording the image signal encoded by said encoding means and the additional information generated by said additional information generation means onto the recording medium;
   control means for controlling the recording means to start recording from a track at a head of the n×m tracks on which the image signal for two frames is recorded, in the case where the image signal and the additional information are newly recorded in said second recording means onto the recording medium; and
   reproduction means for reproducing the image data and the additional information from the recording medium, wherein said control means determines recording start timing based on only the additional information reproduced by the reproduction means.

2. An apparatus according to claim 1, wherein said control means determines the recording start timing based on the additional information reproduced from a predetermined number of tracks immediately before a recording start position.

3. An apparatus according to claim 1, wherein said control means detects a track phase in the n×m tracks based on the additional information reproduced from a track immediately before a recording start position, and determines the recording start timing based on the track phase.

4. An apparatus according to claim 1, wherein the additional information is track pair number information having a value that varies every two tracks.

5. An apparatus according to claim 1, wherein the additional information contains pilot frame information indicating a recording state of a pilot signal which is recorded while being multiplexed onto the image signal.

6. An apparatus according to claim 1, wherein said additional information generation means generates the additional information having contents that vary every track, in a cyclic manner in a unit of the m tracks.

7. An apparatus according to claim 1, further comprising image capturing means for capturing an image of an object and outputting an image signal to said encoding means.

8. A recording apparatus for halfway recording a new image signal obtained by encoding an image signal of an image captured by an image capturing section, onto a recording medium on which additional information is recorded in a cyclic manner in a unit of m tracks, m being an integer of 2 or greater, with an encoded image signal being recorded on n×m/2 tracks per one frame, wherein the halfway recording is performed in a unit of 2 frames.

9. A recording apparatus for halfway recording a new image signal obtained by encoding an image signal of an image captured by an image capturing section, onto a recording medium on which additional information is recorded in a cyclic manner in a unit of m tracks, m being an integer of 2 or greater, with an encoded image signal being recorded on n×m/2 tracks per one frame, wherein the halfway recording is performed in a unit of n×m tracks.

10. A recording apparatus, comprising:
signal processing means for cyclically processing an input image signal in a period of n frames, n being an integer of 2 or greater;
additional information generation means for generating additional information having contents that cyclically vary in the n-frame period of the image signal;
recording means for forming a plurality of tracks on a tape-shaped recording medium by using a rotary head and for recording the image signal output from said signal processing means and the additional information generated by said additional information generation means on m tracks, m being an integer of 1 or greater, out of the tracks for one frame; and
control means, in response to a direction to end the recording, for controlling said recording means to terminate the recording at the final track of n×m tracks on which the image signal for n frames is recorded in a cyclic manner.

11. An apparatus according to claim 10, further comprising detection means for detecting a phase of a track onto which recording is being executed by said recording means within the n×m tracks, based on the additional information recorded by said recording means, wherein said control means controls said recording means based on a result of detection obtained by said detection means.

12. An apparatus according to claim 10, wherein said signal processing means includes a memory for recording the image signal of the n frames, and the control means controls said recording means to terminate the recording at the final track based on a read-out address of said memory.

13. An apparatus according to claim 10, wherein the additional information is track pair number information that increases by a predetermined value every two tracks in a cycle of the n frames.

14. An apparatus according to claim 10, further comprising processing phase detection means for detecting a processing phase of said signal processing means in the n-frame period, wherein said control means controls said recording means to terminate the recording at the final track, based on a result of detection obtained by said processing phase detection means.

15. An apparatus according to claim 10, wherein said signal processing means encodes the input image signal in accordance with SD High Compression Specifications defined by HD Digital VCR Conference, and said recording means records the encoded image signal on the tape-shaped recording medium in accordance with the SD High Compression Specifications.

16. A recording apparatus for forming a plurality of tracks on a tape-shaped recording medium by using a rotary head and for recording an image signal obtained by cyclically processing an input image signal in a cycle of n frames, n being an integer of 2 or greater, by a signal processing circuit and additional information having contents that cyclically vary in the n-frame period of the image signal on m tracks, m being an integer of 1 or greater, out of the tracks for one frame, wherein, in response to a direction to end the recording, the recording is terminated at the final track of n×m tracks on which the n-frame image signal is recorded in a cyclic manner.

* * * * *

UNITED STATES PATENT AND TRADEMARK OFFICE
CERTIFICATE OF CORRECTION

PATENT NO.         : 7,136,572 B2                                       Page 1 of 1
APPLICATION NO. : 10/091460
DATED              : November 14, 2006
INVENTOR(S)       : Yoshiyuki Watanabe It is certified that error appears in the above-identified patent and that said Letters Patent is hereby corrected as shown below:

<u>COLUMN 1</u>

Line 67, "the-previously" should read --the previously--.

<u>COLUMN 6</u>

Line 14, "third" should read --three--.
Line 19, "third-fourths" should read --three-fourths--.
Line 24, "write" should read --writes--.
Line 61, "output" should read --outputs--.

Signed and Sealed this

Eleventh Day of December, 2007

JON W. DUDAS
*Director of the United States Patent and Trademark Office*